United States Patent [19]
Rischard et al.

[11] Patent Number: 5,829,995
[45] Date of Patent: Nov. 3, 1998

[54] ADAPTER FOR BUS BAR SYSTEMS

[75] Inventors: Karl Rischard, Schafisheim; Markus Müller, Eltville am Rhein, both of Germany

[73] Assignee: Allen-Bradley Company, Inc., Milwaukee, Wis.

[21] Appl. No.: 701,300

[22] Filed: Aug. 21, 1996

[30] Foreign Application Priority Data

Sep. 4, 1995 [CH] Switzerland .................. 02-509/95

[51] Int. Cl.[6] .................................................. H01R 4/60
[52] U.S. Cl. .................................................. 439/212
[58] Field of Search ..................................... 439/212, 213

[56] References Cited

FOREIGN PATENT DOCUMENTS

| | | |
|---|---|---|
| 7923422 | 4/1980 | Germany . |
| 3510210 A1 | 10/1986 | Germany . |
| 8903582 | 5/1989 | Germany . |
| 9003885 | 6/1990 | Germany . |

*Primary Examiner*—Gary F. Paumen
*Attorney, Agent, or Firm*—John M. Miller; John J. Horn

[57] ABSTRACT

The invention relates to an adapter for bus bar systems with a base element (1, 8, 9, 10) equipped with attachment feet (8, 9, 10) to mount the base element onto the bus bars (11) in a mounting direction (B) perpendicular to the longitudinal direction (A) of the bus bars; with an automatic locking mechanism of the base element onto the bus bar system by means of a locking part (26) contained within the base element. In order to ensure a secure connection between the bus bar system and the adapter in the longitudinal direction of the respective bus bar, the invention suggests that the locking part provide a cutting-edge (27) positioned in the mounting direction to obtain an incisive engagement with one of the bus bars when mounting the base element.

21 Claims, 3 Drawing Sheets

ADAPTER FOR BUS BAR SYSTEMS

FIELD OF INVENTION

The present invention relates to an adapter for bus bar systems, comprising base element equipped with attaching shoes for affixing the base element onto bus bars in a mounting direction perpendicular to the longer side of the bus bars. More generally, the base element is automatically locked onto the bus bar system by means of a locking part contained within the base element.

BACKGROUND OF THE INVENTION

Bus bars, which generally are manufactured from flat copper, establish access to the power source within a switching circuit. On these bus bars, outlets are located from which current is distributed to individual power consumers. In order to protect cables and other parts of the electrical system from short-circuit or overload, fuses are utilized whenever necessary.

An adapter for bus bar systems of the type mentioned earlier is known from DE-GM 89 03 582. This adapter is equipped with a springy locking lever mounted on the underside of the base element and is composed of several successively arranged stop ledges intended to provide a releasable connection to bus bars of varying widths. This locking mechanism serves the purpose of securing the adapter in the direction in which it is fastened onto the respective bus bar through attachment feet on the one side of the bus bar, and through the locking lever on the other side. However, the utilized locking mechanism is not suitable for fastening the adapter in the longitudinal direction of the bus bar system.

The fastening of the adapter in the longitudinal direction of the bus bar system is especially suitable, when the bus bars are arranged vertically and thereby present a potential danger that an electric instrument, or electric instruments, connected to the base element can be displaced, along with the base element, relative to the bus bars. Apart from that, it is also of advantage in any other installation position of the bus bars, to ensure that no relative displacement of bus bars and base elements can occur.

A connecting terminal mountable onto bus bars is known from DE-OS 35 10 210. The connecting terminal consists of a U-shaped clamp housing with snout-shaped cut-outs in which the bus bar engages. A retaining spring, made of flat spring material and shaped like a leg spring, is inserted in the clamp housing. The unattached end of the shape-mated retaining spring leg butts against the bus bar, and in this manner, clamps the housing to the bus bar. The form-fitting is achieved when the unattached end of the retaining spring, because of its elastic force, slightly digs into the softer material of the bus bar as the connecting terminal is mounted onto the bus bar. The disadvantage of this device is that the narrow side of the flat material of the retaining spring is aligned with the longitudinal direction of the bus bar. Thus, when the end of this retaining spring grabs into the bus bar, only the narrow side of the flat material holds the connecting terminal back onto the bus bar in the longitudinal direction. This retaining force is insufficient, especially in the case of adapters to which heavy equipment is connected.

SUMMARY OF THE INVENTION

It is the task of the present invention to construct an adapter for bus bar systems to ensure a secure connection to the bus bar system in it's longitudinal direction.

The problem at hand is solved through the following feature of the locking part: its cutting-edge is arranged in the mounting direction so that it will cut, at contact, at least into one of the bus bars. Thus the locking part of the invention cuts into at least one of the bus bars as the base element is mounted onto the bus bars. This assumes that at least the cutting-edge of the locking part has a hardness greater than that of the bus bar. Certainly, it is also possible that a locking part cuts into several bus bars, or that several locking parts are provided, where each locking part cuts into a respective bus bar. Within the adapter, in accordance with the invention, the base element serves preferably as receptor of one or more electric instruments, or is an integral part of an electric instrument.

In general, the entire locking part, or at least its cutting edge consists of hard metal, particularly steel, while the bus bars consist of soft metal, particularly copper or aluminum, or an alloy of either metal.

The base element is conveniently equipped with a housing and attachment feet. In order to produce the previously specified effect, each respective locking part can be contained inside the housing or within the attachment foot. However, it is regarded as advantageous to have the locking part contained in the housing.

According to a special implementation configuration of the invention, it is intended to design the locking part as a flat, thin-walled platelet. Such a locking part is simple to manufacture, whereby the cutting-edge of the locking part emerges simply as a result of the circumstance that the locking part is designed as a thin-walled platelet, thereby exhibiting a narrow edge, which is suitable for the incisive engagement with the bus bar, which occurs as the base element is mounted onto the bus bar. If necessary, the thin-walled platelet can be ground even sharper in the edge region.

A preferred configuration intends to arrange the main platelet plane perpendicular to the longer side of the bus bar. Thus, the housing of the base element, when attached onto the bus bar, must absorb only the pressure exerted by the platelet. Consequently, the seating of the platelet inside the housing can be performed very easily.

A further favorable development of the invention provides for a locking part contained in a module that is mountable onto the housing. Such a module represents the simple possibility of expanding the structure and function of an available adapter. Based on this module, an already available base element can be retrofitted without any further complications, using the locking part of the invention. The module consists of two bearing plates which are joined together and carry the platelet in between. One of the bearing plates is provided with a bearing pin oriented perpendicular to the main plane of the platelet. The pin penetrates an opening in the platelet and one in the other bearing plate. Thus, the bearing pin facilitates a centered reception of the platelet in the module. Furthermore, the pin is additionally held in the other bearing plate, so that the force transferred through the platelet— as the base element is mounted onto the bus bar— and exerted onto the assigned bus bar can be absorbed by both bearing plates. The manufacture of the module becomes simple especially then when this, as well as the adapter, is made of plastics, specifically, when it is made as an injection mold part, thus making it possible to leave both bearing plates joined with each other by a film hinge. On their sides facing away from the film hinge, the bearing plates are provided with suitable latch parts so that they can be joined together on this side. The bearing pin is designed in a favorable conic shape and penetrates, as the bearing plates are joined together, the circular opening in the platelet, eliminating any radial play. Accordingly, the opening prescribes in a simple manner a definite position of the locking parts, and thus, of their cutting-edge in relation to the assigned bus bar.

An especially favorable design of the cutting-edge is to introduce an angle to the edge, resulting in a first, a leading cutting-edge section making contact with the bus bar, while enclosing an acute angle between it and the main bus bar area turned toward this section— as the base is mounted onto the bus bar; as well as a second, a trailing cutting-edge section following the first cutting-edge section. These sections are arranged parallel to the contacting main area of the assigned bus bar. This configuration of the cutting-edge ensures that, with an increased attachment of the base onto the bus bar, the locking element cuts more deeply into the bus bar, and, after having reached a maximum of incision depth, the second cutting-edge section can contact the previously incised area of the bus bar, so that the transferred forces acting between the bus bar and the base element are essentially perpendicular to the contacting main area of the bus bar. It is certainly possible, as described earlier when reviewing the status of technology, that more locking elements can be provided for, which can securely fasten the adapter in a direction opposite to its mounting direction. Also, several locking elements— which are in compliance with the invention— can be provided in the base to fasten the adapter.

Further characteristics of the invention are presented in the descriptions of the figures and the sub-claims.

BRIEF DESCRIPTION OF THE DRAWINGS

In the figures, the invention is presented, by way of an example. However, the invention is not limited to the example illustrated in the FIGS. The figures show the following.

DESCRIPTION OF THE PREFERRED EMBODIMENT

Figure 1:
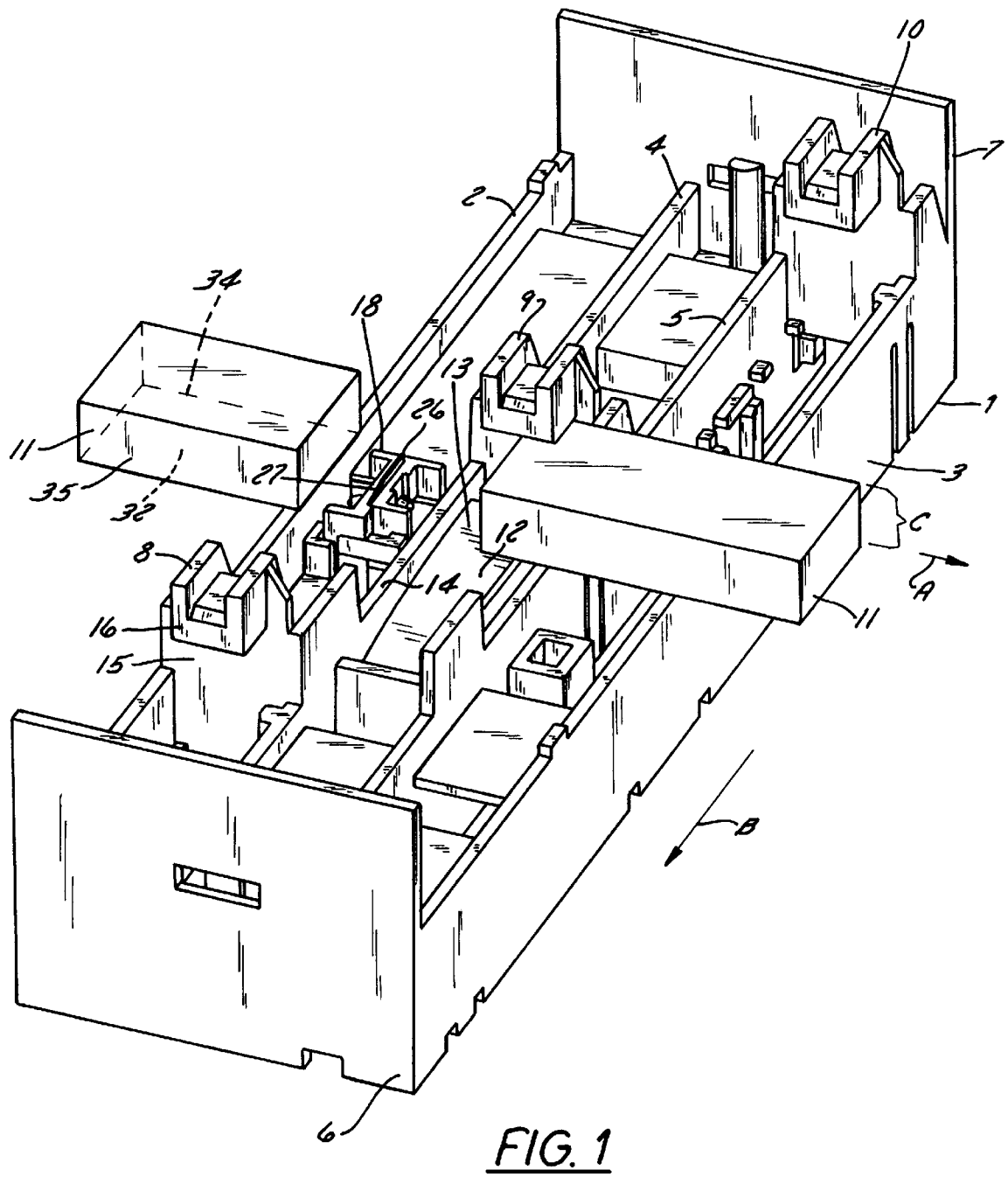
FIG. 1 is a perspective view of the adapter, in accordance with the preferred embodiment of the present invention, with the locking part inserted inside the adapter housing.
Figure 2:
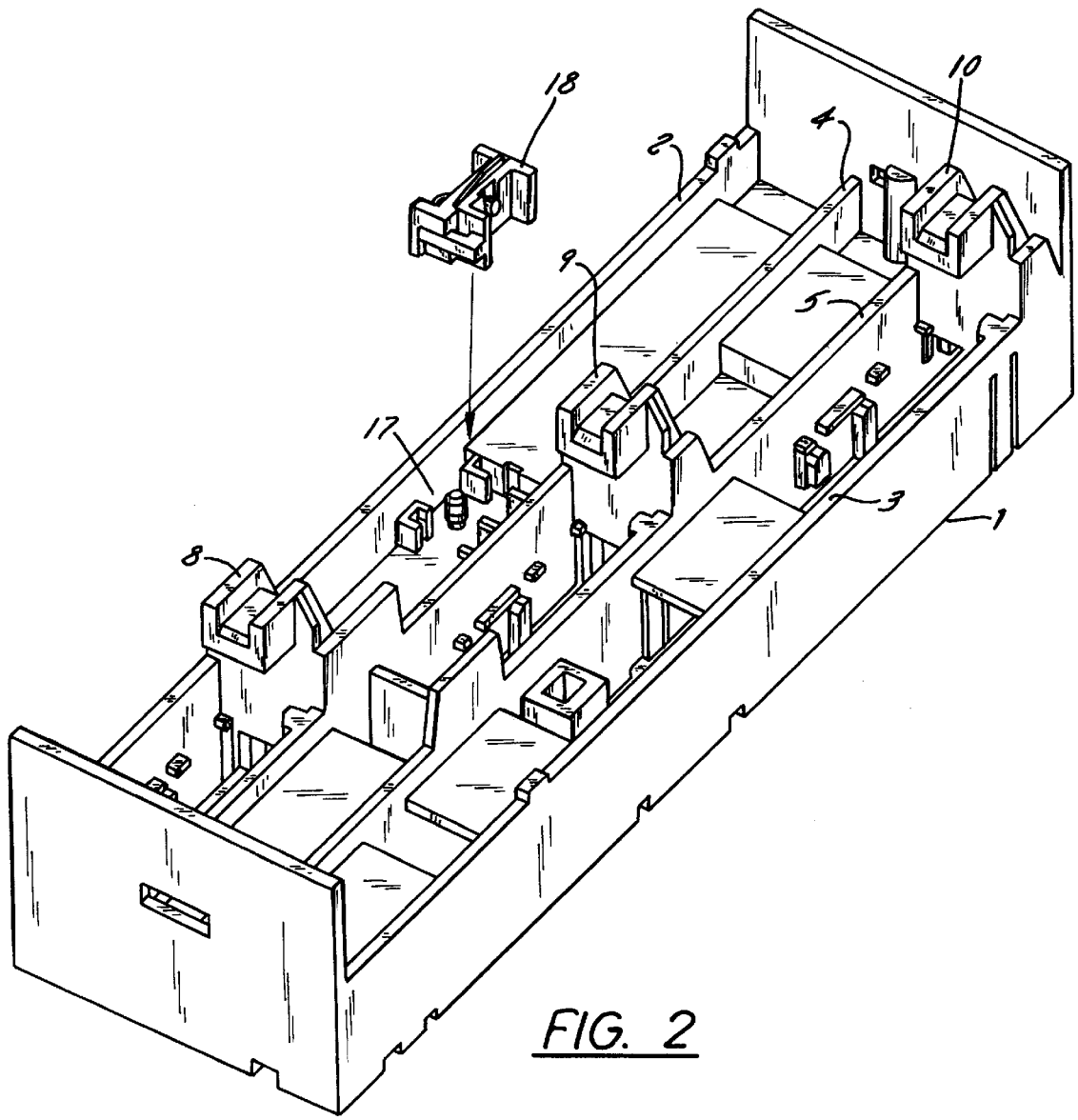
FIG. 2 is a perspective view of the adapter shown in FIG. 1 with the locking part removed.

FIGS. 1 and 2 show, in a very simplified manner, an adapter for bus bar systems, whereby this adapter accommodates the reception of an electric instrument on the side facing away from the bus bar. The adapter is equipped with a base element 1, which, by means of both of its outer long walls 2 and 3, as well as the two separating walls 4 and 5 located in between, is separated along its longer side into three chambers. Frontally, the chambers are limited through the front walls 6 and 7 of the base element. Three equally spaced attachment feet 8, 9 and 10, are stored in the base element 1; each of them is assigned to one of the separated chambers and is used for the attachment of a bus bar, respectively. In FIG. 1, only the middle bus bar 11 is shown. This is engaged by the attachment foot 9, which grabs it from behind. In order to better illustrate the adapter configuration in accordance with the invention, the bus bar 11 is depicted in an interrupted fashion, even though in reality it obviously stretches in its entirety in the direction A of the bus bar system of its length without interruption. The other two bus bars assigned to attachment feet 8 and 9 and aligned parallel to bus bar 11 are, for the purpose of graphic clarity, not included in the drawing. For this same reason, only the bent contact spring 12 assigned to the middle chamber is illustrated. Its unattached leg 13 lies in a relatively relaxed manner at the upper edge of the separating wall 4. The contact spring 12 is essentially constructed in a U shape, whereby the other— not illustrated— leg is fastened to the base of the housing 1 and is connected in a conductive manner with the electric instrument received by the base element. Similarly, the housing 1 is also provided with contact springs 12 in the areas of the attachment feet 8, 10. However, for reasons of graphic clarity, these are not illustrated either.

As it can be inferred from the presentations in FIGS. 1 and 2, each respective attachment foot 8, 9 and 10 displays a plate section 15 connected to the housing 1 perpendicular to the mounting direction B of the adapter, as well as a foot-section 16 in the region of its unattached end, oriented in the mounting direction B.

The three bus bars feature rectangular cross-sections, and are spaced in accordance with the spacing of the attachment feet 8, 9 and 10, so that, when mounting the attachment feet 8, 9 and 10 onto the bus bars, the contact spring 12 will press the bus bar 11 against the foot-section 16; and the bus bar 11 will, for the rest, lie against the plate section 15. Thereby the pressure exerted by the contact spring 12 increases, because of its curvature, with a progressive insertion of the attachment feet. A further locking of the bus bar 11 results on its side facing away from the plate section 15 through a further, not shown, locking element. The same is true about the fastening of the two other bus bars.

From the presentation of FIG. 2, it can be seen that in the space formed between the outer long wall 2 and the separation wall 4 underneath the inserted bus bar 11, an inserting shaft 17 is provided for a locking part 18, which can be inserted from the top into the inserting shaft 17. The inserted position of the locking part 18 is clearly illustrated in FIG. 1.

Figure 3:
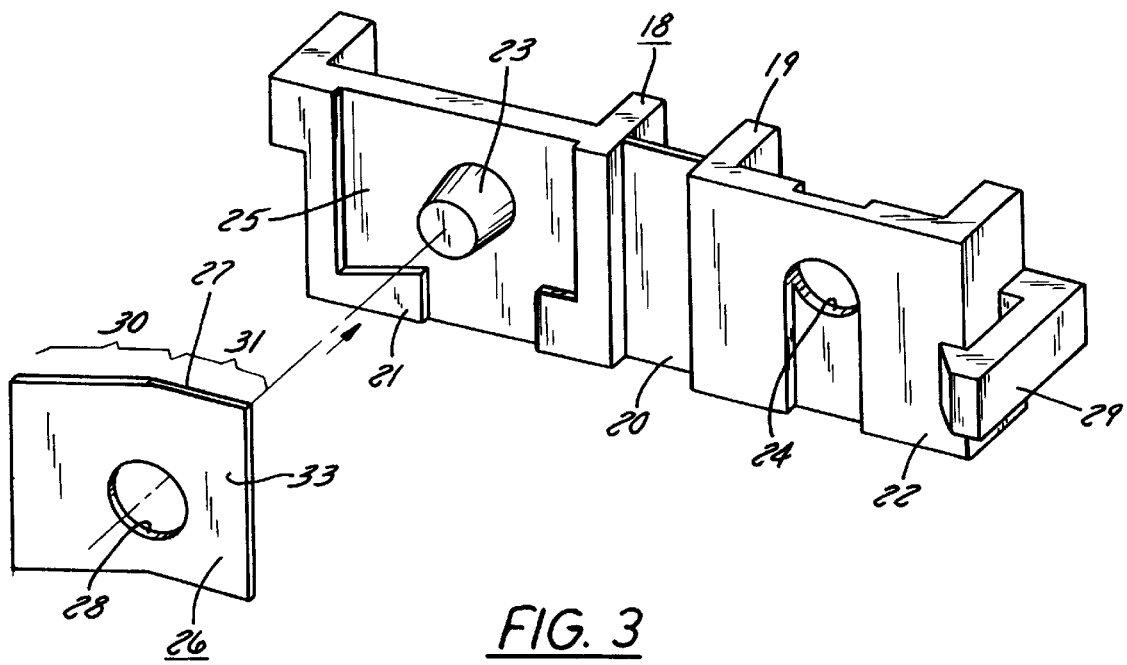
FIG. 3 is a perspective view of the module, unfolded for the reception of a locking platelet between the two bearing plates, shown prior to inserting the platelet into one of the bearing plates.
Figure 4:
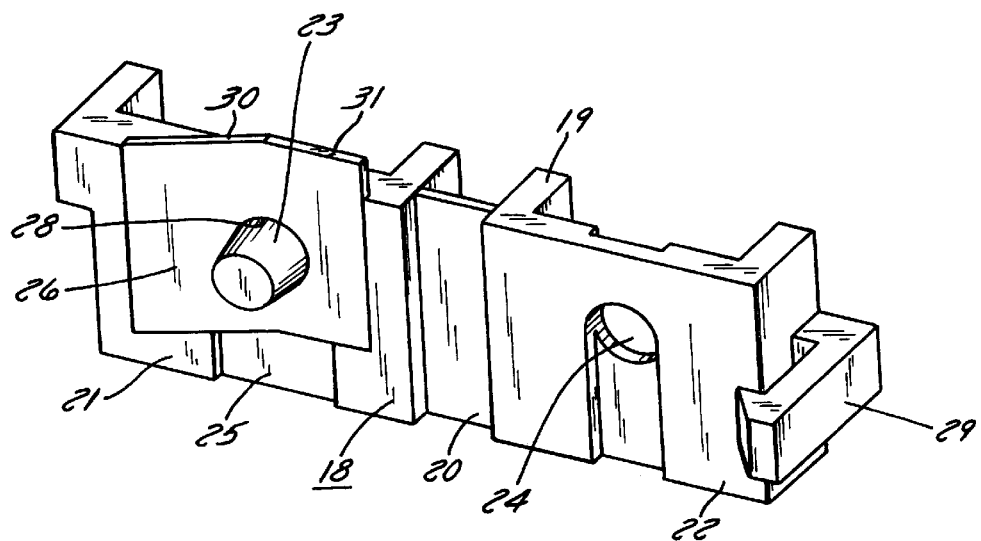
FIG. 4 is a presentation in accordance with FIG. 3, after the insertion of the platelet.

FIGS. 3 and 4 illustrate in detail the design of the locking part 18. This features a module 19 which can be inserted into the housing 1 in the previously described manner, i.e. perpendicular to the longitudinal direction A of the bus bar 11 and perpendicular to the mounting direction B of the housing 1. The module 19 is designed as an injection molded plastic part and consists of two bearing plates 21, 22 joined together with a film hinge 20. One bearing plate 21 is equipped with a bearing pin 23, which is conically shaped and, when the bearing plates 21, 22 are folded together, penetrates a bore 24 in the bearing plate 22. In a plane perpendicular to the bearing pin 23, the bearing plate 21 is additionally provided with a back-cutting 25, which facilitates the reception of a locking part of the type of a flat, thin-walled platelet 26 made of hardened steel. The side and bottom contours of the platelet 26 are adjusted to the contours of the back-cutting 25 located at the bearing plate 21, while the top edge 27, which exhibits the function of a cutting-edge, protrudes above the bearing plates 21, 22. In addition, the platelet 26 is provided with a bore 28, which is adjusted to the outer diameter of the bearing pin 23 at the surface area of the back-cutting 25, so that the platelet can be picked up by the bearing pin 23 essentially without any play. The bearing plate 22 is equipped with a form-fitted latch hook 29 at its end region that faces away from the film hinge 20. The latch hook 29 locks behind complementary index notches (not shown) in that area of the bearing plate 21 which faces away from the film hinge 20, when the module 19 is assembled by folding bearing plate 22 on top of bearing plate 21, and after having inserted the platelet 26 in advance. Thus, the platelet 26 is held in place inside the module 19 and it needs only to be inserted in the plug-in shaft, with the bearing pin oriented in the longitudinal direction A. In this position, the cutting-edge 27 of the platelet 26 is oriented in the mounting direction B. As a result, the insertion height of the module 19 relative to the housing 1 is dimensioned in such that the minimum distance between the cutting-edge 27 and the foot-section 16 of the attachment foot 9 is less than the thickness C of the bus bar 11. A minimum distance is required because, as can be gathered especially from the presentations FIGS. 3 and 4, the cutting-edge does not run straight, but is at an angle. Therefore, as the base 1 is mounted onto the bus bar 11, a first cutting-edge section 30 contacts the main surface area 32 of the bus bar 11 forming an acute angle with it; then a second cutting-edge section 31 follows the first cutting-edge section 30. Both the first cutting-edge section 30 and the second cutting-edge section 31 are arranged parallel to the main surface area 32. In the preferred embodiment, the angle between the cutting-edge section 30 and the main surface area 32 ranges between 5° and 20°.

As the adapter is mounted onto the three bus bars, the apex areas of the three contact springs 12 contact the bus bars 11 first and lead these with an increasing mounting path in the direction of the main plane 33 of the platelet 26 to the foot-section 16 of the respective attachment foot 8, 9, 10. As soon as the foot-section 16 grabs the bus bar 11 from behind, the platelet 26 now located underneath the bus bar 11 attains, with its leading cutting-edge section 30, contact with the edge 34 of the bus bar 11 and cuts into this, until finally, with an increasing mounting motion, the trailing cutting-edge section 31 becomes also effective. When the housing 1 is completely mounted, the incision made by the platelet 26 in the main surface area 32 of the bus bar 11 originating at edge 34 extends at first over the entire length of the cutting-edge section 31 and from there over a segment of cutting-edge section 30, whereby the foremost region of this cutting-edge section 30 extends beyond the bus bar 11. Furthermore, when the housing 1 is completely mounted, the additional locking element, which is not shown, locks one of the bus bars in the region of the side surface area 35.

Based on the incisive action of the platelet 26 onto at least one of the bus bars— aforesaid the bus bar 11— the housing 1 and along with it the adapter is locked in the longitudinal direction A of the bus bar system.

Various modifications and alterations in the described apparatus will be apparent to those skilled in the art from the foregoing description which does not depart from the spirit of the invention. For this reason, these changes are desired to be within the scope of the appended claims. The appended claims recite the only limitations of the present invention and the descriptive matter which is employed for setting forth the present embodiment is to be interpreted as illustrative and not limitative.

We claim:

1. An adapter for a bus bar system having a plurality of bus bars defining a longitudinal direction, the adapter comprising:
    a base element comprising attachment feet that secure the base element onto the bus bar system in a mounting direction perpendicular to the longitudinal direction of the bus bars;
    an automatic locking mechanism that secures the base element onto the bus bar system in the longitudinal direction, the locking mechanism comprising a locking part, the locking part defining a cutting-edge arranged to incisively engage at least one of the bus bars as the base element is mounted.

2. The adapter in accordance with claim 1, wherein the locking part is contained inside the base element.

3. The adapter in accordance with claim 1, wherein the locking part comprises a flat, thin-walled platelet.

4. The adapter in accordance with claim 1 wherein the locking part is made of a metal which is harder than a metal of which the bus bars are made.

5. The adapter in accordance with claim 1, wherein the base element is a receptor for an electric instrument.

6. The adapter in accordance with claim 5, wherein the base element further comprises contact springs held inside the base element, the contact springs and the contact feet contacting opposite sides of the bus bars.

7. The adapter in accordance with claim 6, wherein the contact springs each exert a contact pressure against a respective bus bar, and wherein the contact springs are each curved so as to produce the contact pressure when the base element is secured to the bus bars.

8. The adapter in accordance with claim 1, wherein a portion of the cutting edge is substantially perpendicular to the longitudinal direction of the bus bars.

9. An adapter for a bus bar system having a plurality of bus bars defining a longitudinal direction, the adapter comprising:
    a base element comprising attachment feet that secure the base element onto the bus bar system in a mounting direction perpendicular to the longitudinal direction of the bus bars;
    an automatic locking mechanism that secures the base element onto the bus bar system, the locking mechanism comprising a locking part, the locking part defining a cutting-edge arranged to incisively engage at least one of the bus bars as the base element is mounted, the locking part comprising a flat, thin-walled platelet, the platelet defining a primary plane and a secondary plane, and the primary plane being arranged perpendicular to the longitudinal direction of the bus bars.

10. An adapter for a bus bar system having a plurality of bus bars defining a longitudinal direction, the adapter comprising:
    a base element comprising attachment feet that secure the base element onto the bus bar system in a mounting direction perpendicular to the longitudinal direction of the bus bars;
    an automatic locking mechanism that secures the base element onto the bus bar system, the locking mechanism comprising a locking part, the locking part defining a cutting-edge arranged to incisively engage at least one of the bus bars as the base element is mounted; and
    a module which is inserted into the base element, the locking part being contained in the module.

11. The adapter in accordance with claim 10, wherein the module comprises first and second bearing plates which are joined together, wherein the platelet is mounted between the first and second bearing plates, and wherein one of the first and second bearing plates includes a bearing pin oriented perpendicular to the primary plane of the platelet.

12. The adapter in accordance with claim 11, wherein the first and second bearing plates are joined together by a film hinge and latch parts, the latch parts locking the first and second bearing plates into proximal parallel planes when the first and second bearing plates are folded about the film hinge.

13. The adapter in accordance with claim 12, wherein the bearing pin is conically shaped and penetrates a circular opening defined by the platelet, the bearing pin preventing radial movement of the platelet about the bearing pin.

14. An adapter for a bus bar system having a plurality of bus bars defining a longitudinal direction, the adapter comprising:

a base element comprising attachment feet that secure the base element onto the bus bar system in a mounting direction perpendicular to the longitudinal direction of the bus bars;

an automatic locking mechanism that secures the base element onto the bus bar system, the locking mechanism comprising a locking part, the locking part defining a cutting-edge arranged to incisively engage at least one of the bus bars as the base element is mounted, the cutting-edge including a first leading cutting-edge, the first leading cutting-edge contacting, and forming an acute angle with, one of the bus bars, and a second trailing cutting edge, the second trailing cutting edge following the first leading cutting edge and being arranged perpendicular to the longitudinal direction of the bus bars.

15. The adapter in accordance with claim 14, wherein the acute angle is between 5° and 20°.

16. An adapter for a bus bar system having a plurality of bus bars defining a longitudinal direction, the adapter comprising:

(A) a base element comprising attachment feet that secure the base element onto the bus bar system in a mounting direction perpendicular to the longitudinal direction of the bus bars;

(B) an automatic locking mechanism that secures the base element onto the bus bar system in the longitudinal direction, the locking mechanism comprising a locking part, the locking part being contained inside the base element, the locking part comprising a flat, thin-walled platelet, the platelet defining a primary plane and a secondary plane, the primary plane being arranged perpendicular to the longitudinal direction of the bus bars, the locking part being made of a metal which is harder than a metal of which the bus bars are made, the locking part defining a cutting-edge arranged to incisively engage at least one of the bus bars as the base element is mounted, the cutting-edge including (1) a first leading cutting-edge, the first leading cutting-edge contacting, and forming an acute angle with, one of the bus bars, and (2) a second trailing cutting edge, the second trailing cutting edge following the first leading cutting edge and being arranged perpendicular to the longitudinal direction of the bus bars; and (C) a module which is inserted into the base element, the module containing the locking part, the module including first and second bearing plates which are joined together, the platelet being mounted between the first and second bearing plates, one of the first and second bearing plates including a bearing pin oriented perpendicular to the primary plane of the platelet, the bearing pin being conically shaped and penetrating a circular opening defined by the platelet, the bearing pin preventing radial movement of the platelet about the bearing pin.

17. The adapter in accordance with claim 16, wherein the acute angle is between 5° and 20°.

18. The adapter in accordance with claim 16, wherein the base element further comprises contact springs held inside the base element, the contact springs and the contact feet contacting opposite sides of the bus bars.

19. The adapter in accordance with claim 17, wherein the contact springs each exert a contact pressure against a respective bus bar, and wherein the contact springs are curved so as to produce the contact pressure when the base element is secured to the bus bars.

20. The adapter in accordance with claim 16, wherein the first and second bearing plates are joined together by a film hinge and latch parts, the latch parts locking the first and second bearing plates into proximal parallel planes when the first and second bearing plates are folded about the film hinge.

21. The adapter in accordance with claim 19, wherein the bearing pin is conically shaped and penetrates a circular opening defined by the platelet, the bearing pin preventing radial movement of the platelet about the bearing pin.

* * * * *